AUTOMATIC DIAL RADIO TELEPHONE SYSTEM

Filed Sept. 30, 1957 5 Sheets-Sheet 1

INVENTOR.
RAMSEY McDONALD
BY Darby & Darby
ATTORNEYS

Nov. 14, 1961 R. McDONALD 3,009,149

AUTOMATIC DIAL RADIO TELEPHONE SYSTEM

Filed Sept. 30, 1957 5 Sheets-Sheet 2

INVENTOR.
RAMSEY McDONALD
BY Darby & Darby
ATTORNEYS

Nov. 14, 1961 R. McDONALD 3,009,149

AUTOMATIC DIAL RADIO TELEPHONE SYSTEM

Filed Sept. 30, 1957 5 Sheets-Sheet 3

INVENTOR.
RAMSEY McDONALD
BY Darby & Darby
ATTORNEYS

INVENTOR.
RAMSEY McDONALD
BY Darby & Darby
ATTORNEYS

INVENTOR.
RAMSEY MC DONALD
BY Darby & Darby
ATTORNEYS

United States Patent Office 3,009,149

Patented Nov. 14, 1961

3,009,149
AUTOMATIC DIAL RADIO TELEPHONE SYSTEM

Ramsey McDonald, 429 SW. 5th St., Richmond, Ind.

Filed Sept. 30, 1957, Ser. No. 687,257
9 Claims. (Cl. 343—177)

The present invention relates to automatic radio telephone systems and particularly concerns automatic non-attended two-way dial-operated radio telephone systems adapted for communication with mobile stations wherein the mobile stations can send and receive dial calls to and from a connected wire telephone exchange and also can dial directly to other mobile stations in the system.

This application represents improvements and additions to the invention shown in my prior U.S. Patent No. 2,722,598, issued November 1, 1955. The system shown in the above patent provided for direct dialing between mobile receiver-transmitters and subscribers of a telephone central exchange. However, no provision was made for direct dialing between mobile receiver-transmitters in the radio telephone system shown in Patent No. 2,722,598.

The present invention provides a system wherein the respective mobile receiver transmitter stations of a radio telephone system may dial any other mobile station of the system through the fixed station receiver, transmitter and termination equipment. In addition, the mobile receiver-transmitters may dial subscribers of a telephone system central dial exchange to which the radio telephone system is interconnected.

Long distance calls may also be placed through the telephone system central exchange to which the automatic radio telephone system is interconnected. If desired, the system may be arranged so that calls may be made by direct long distance dialing to any locality, to the extent which the telephone system central exchange interconnected with the radio telephone system has direct long distance dialing facilities.

Ordinarily the receiver-transmitters which are termed mobile receiver-transmitters will be installed in a land vehicle such as a truck or automobile. However, it should be understood that these receiver-transmitters may also be installed in boats, in airplanes or in fixed locations. Thus the term mobile unit, mobile receiver and the like used in the specification and claims is to be interpreted to include any radio telephone system subscriber station set installed in a land, sea or air vehicle or at a fixed location.

According to the present system the normal mobile unit will be provided with a two-way radio installation. Mobile radio transmitters and receivers will normally be assigned different frequencies. Normally two frequencies will be used in a system, one for transmitting from the mobile stations to the base station and one for transmitting from the base station to the mobile stations. The radio telephone system will therefore be capable of handling only one conversation at a time and will correspond to a party line in wire communication practice.

There is virtually no limit to the number of mobile units which could be incorporated in a single radio telephone system. However, since only one conversation may be carried at a time, as a practical matter the number of mobile stations in a single system is preferably limited to 50–100 units.

Although separate receiving and transmitting frequencies are used and the radio telephone system is therefore technically a duplex system, push-to-talk operation of the radio transmitters is utilized both for power economy and also for system control reasons as will be explained.

When the radio telephone system is installed in conjunction with a telephone system central exchange any subscriber of the telephone exchange may dial a number which will connect him through the telephone central exchange to the radio telephone system. The telephone system central exchange subscriber will hear a busy signal if the radio telephone system is in use. If the system is not in use he may then proceed to dial additional digits which will cause him to be connected to whichever one of the mobile units he desires to call. When the called mobile station responds, full two-way communication may be conducted between the telephone system central exchange subscriber and the mobile station.

Mobile stations of the radio telephone system may also initiate a direct dial call by dialing a code number, which may for example be the number 9. The mobile station is thereby connected through a base station radio transmitter and receiver and radio telephone termination equipment to the telephone system central exchange. The mobile station will then hear the telephone exchange dial tone, after which he may dial any number, which he could dial if he were an ordinary telephone subscriber of the telephone system central exchange. The telephone system central office equipment makes the proper connections in response to his relayed dial signal in the customary manner.

The present invention also makes possible a distinctly different third mode of operation not possible with the apparatus described in my prior U.S. Patent No. 2,722,598. According to the present invention a mobile unit may dial directly to any other mobile unit in the radio telephone system.

In this mode of operation the base station transmitter and receiver act as a relay or repeater station. The mobile units are therefore not limited to the range over which they could communicate unassisted but are enabled to communicate over the greater range made possible by the base station fixed transmitter and receiver. For example, a mobile unit 20 miles north of the base station might call a mobile receiver 20 miles south of the base station under circumstances in which it would be impossible for the two-mobile units to communicate directly.

One mobile station may initiate a call to a second mobile station by first dialing the customary code number used to establish communication with the telephone system central exchange, and then by dialing a second code number designated as the code number for mobile to mobile operation. Having thus identified his call as a mobile to mobile call, the mobile station may then dial by number any other mobile station in the radio-telephone system.

The present invention utilizes two-way radio transmitter and receiver equipment in both the mobile and fixed station which is of conventional type. Tone generator and decoding equipment utilized at the mobile stations to generate a dialing tone signal and the particular mobile station code number is of the same type utilized in systems according to my invention described in Patent No. 2, 722,598. As an example, decoding equipment manufactured by Allen B. Du Mont Laboratories, Inc. designated "Dumont" Tone Generator Mod. No. 67028271 and "Dumont" Tone Selector Mod. No. 67028261 may be utilized in the mobile stations.

In addition to the fact that the present invention provides a system wherein mobile stations may dial directly other mobile stations, other improvements are provided by the present invention.

For example, after a telephone system central exchange subscriber has dialed a number which establishes a wire connection to the radio telephone base station, it is necessary in the present system for him to dial a still further number in order to activate the radio transmitter at the base station. An accidental connection or short circuit in the wires connecting the telephone system central exchange to the radio telephone system therefore will not cause the base station radio transmitter of the radio telephone system to be activated.

The present invention also provides means for supplying a distinctive interrupted tone signal to telephone system central exchange subscribers indicating that the mobile station they have dialed is being signalled. The signal continues until such time as the mobile station responds. Radio telephone systems according to the present invention also provide means for dialing various mobile stations utilizing any combination of numbers of two digits or more. Thus with only two digits 99 mobile stations may be identified, or still further stations could be placed in a system by the use of more than two digits.

In apparatus according to the present invention means are also provided whereby calls involving a telephone system central exchange subscriber will be cut off at the end of three minutes, thus limiting the time of calls and freeing the air-time for the use of other stations in the system. Calls from one mobile station to another will cut off after 30 seconds elapses without one of the mobile stations pressing the push-to-talk button. Inadvertent use of the radio telephone system air-time by mobile stations not actually utilizing the equipment is therefore avoided.

Apparatus is also provided whereby standard recording equipment for broadcasting station identification may be keyed by the radio telephone system at the end of every conversation.

Normally each mobile station will be provided with a transmitter, a receiver and equipment for sending the decoding dial signals. However, in some instances mobile stations of more limited capabilities may be used. For example, some mobile station operators may not wish to receive calls, in which case dial signal decoder equipment would not be utilized.

Other mobile stations could be provided with only receiving equipment together with the usual indicating equipment to indicate that the mobile station had been signalled. In this case only radio receiver equipment and decoding equipment would be involved at the mobile station. Such a station could be dialed in the ordinary manner by either a telephone subscriber or another mobile station having full transmitting equipment. No conversation could take place between another station and such a receiver-only mobile station. However, the mobile station would be signalled and a continuing signal would be indicated on a panel at the mobile station as usual.

Persons calling such a station would understand that they were simply operating a signal indicating that the operator of the receive-only mobile station should call a predetermined telephone number by conventional telephone equipment at his convenience.

The above objects and further objects, advantages and features of the present invention will be apparent from a consideration of the following description in conjunction with the appended drawings in which FIG. 1 is a schematic block diagram of a radio-telephone system according to the present invention showing only two mobile units for the purpose of illustration;

FIG. 2 is a front elevational view of the termination equipment constructed according to the present invention;

FIGS. 3*a* and 3*b* taken together are a schematic circuit diagram of a portion of termination equipment according to the present invention;

Figure 2:
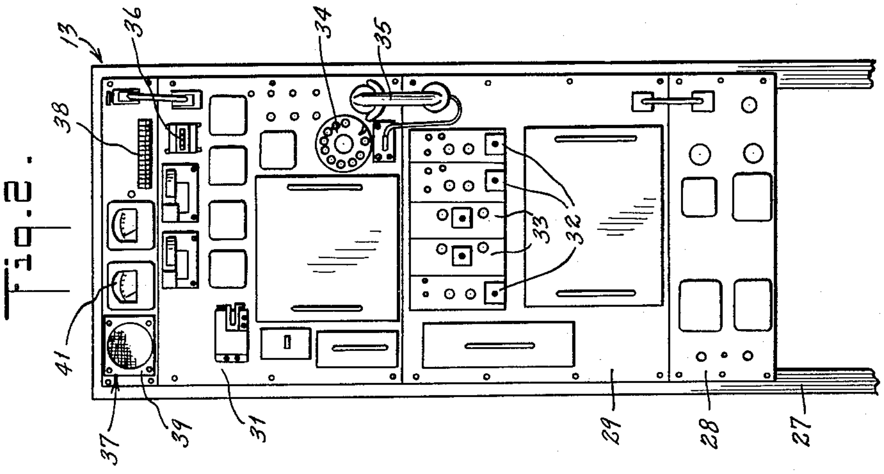

It will be understood that the mobile receiver transmitter units are substantially identical, differing significantly only in the code number which is assigned to the unit to which this unit's dial decoding equipment responds. The mobile receiver transmitter units 11 are adapted to receive signals from and transmit signals to a base transmitter receiver 12 which is coupled to telephone termination equipment illustrated by rectangle 13.

The radio telephone termination equipment 13 is also linked to a conventional telephone system central exchange indicated by the rectangle 14. The base transmitter receiver 12, the radio telephone termination equipment 13 and the telephone system central exchange 14 may be installed at the same location, or they may alternatively be installed at different locations and connected by wire circuits or other communication circuits. The radio telephone termination equipment 13 is connected by two wire pairs 15 and 16 to the telephone system central exchange. Pair 15 is for calls to the mobile receiver transmitters while pair 16 is for calls from the mobile receiver transmitters to telephone system central exchange subscribers.

The base receiver is coupled to the radio telephone termination equipment by a pair of leads 17 while the base transmitter is coupled to the termination equipment by a pair of leads 18. A subscriber station of the telephone system central exchange 14 is shown at 21. Although a single subscriber station 21 is shown, it will be understood that the telephone system central exchange will normally be interconnected with numerous subscriber stations, other local exchanges, and by long distance lines to other distant exchanges. All other stations with which the telephone system central exchange 14 may communicate will be represented by the subscriber station 21 for purposes of illustration.

A further wire lead 22 from the termination equipment 13 to the exchange 14 may be provided to indicate to supervisory personnel that the radio telephone termination equipment is functioning. In the event that an indicator for supervisory personnel were desired at some other location than the exchange 14, a lead 22 could be connected to another location instead of or in addition to the lead 22 to the exchange 14. A further lead 23 from the termination equipment 13 to the exchange 14 is provided to connect with the telephone system central exchange equipment to provide a busy signal on pairs 15 and 16 when the radio telephone system is in use.

Station identification for radio transmissions may be supplied by utilizing a station identificaton repeater 25 connected to termnation equipment 13 by means of a pair of leads 24. Station identification repeater 25 may be any suitable voice record repeater apparatus such as "Pentron Magazine Repeater" Model A–1, manufactured by Pentron Corporation, Chicago, Illinois.

Figure 1:
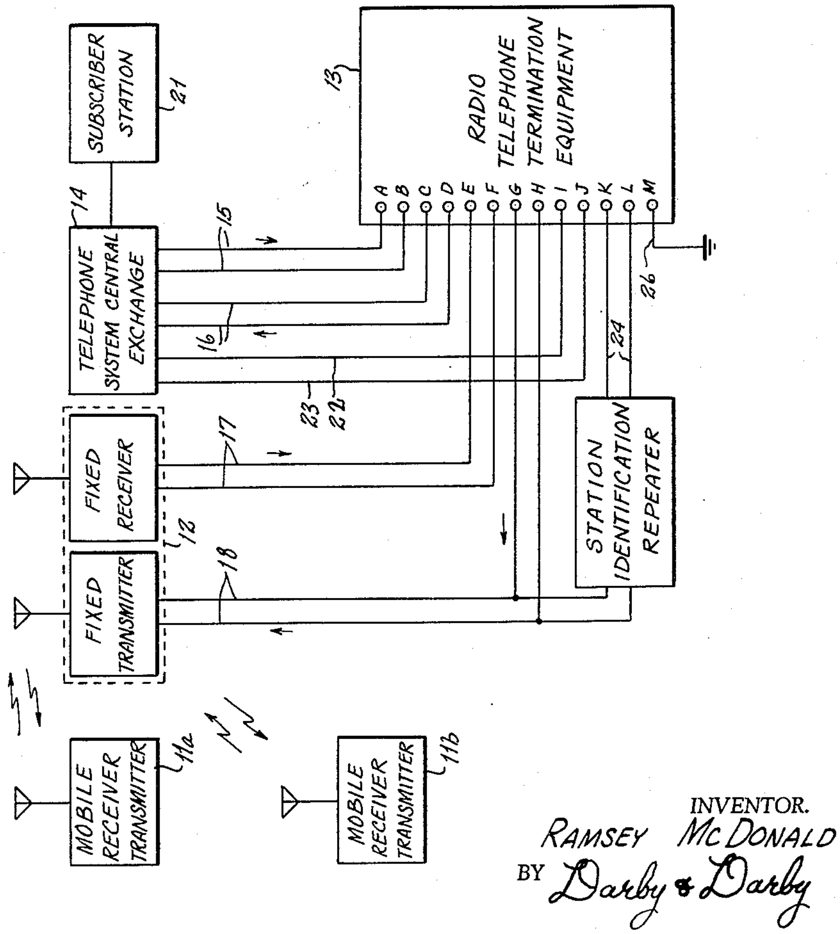
FIGURE 1 shows in schematic form a complete radio telephone system. Mobile receiver-transmitter units indicated at **11*a* and 11*b*** comprise radio receiver and transmitting equipment together with dial tone transmitting and decoding equipment and may be installed in an automotive vehicle, a ship, aircraft or at a stationary position.

Termination equipment 13 is connected to a suitable electrical ground 26 to provide a ground return for certain of the electrical circuits of the radio telephone system. The radio telephone termination equipment shown in block 13 of FIG. 1 is shown in a front elevational view in FIG. 2.

Telephone termination equipment 13 is mounted on a conventional electrical equipment rack 27. A power supply panel 28 is provided and is mounted on the lower portion of the rack 27.

The radio telephone termination switching equipment is mounted on panels 29 and 31. Dial tone generators 32 and dial tone selector circuits 33 are mounted on subpanels on the lower switching panel 29. A test dial 34 and a jack 33 for a test handset are provided. A counter 36 is provided which records the number of calls placed over the system. A termination panel 37 is provided having a terminal strip 38 for connection of leads to and from the termination equipment. Also mounted on the termination panel 37 is a monitor speaker 39 and test meters 41.

Figure 3A:
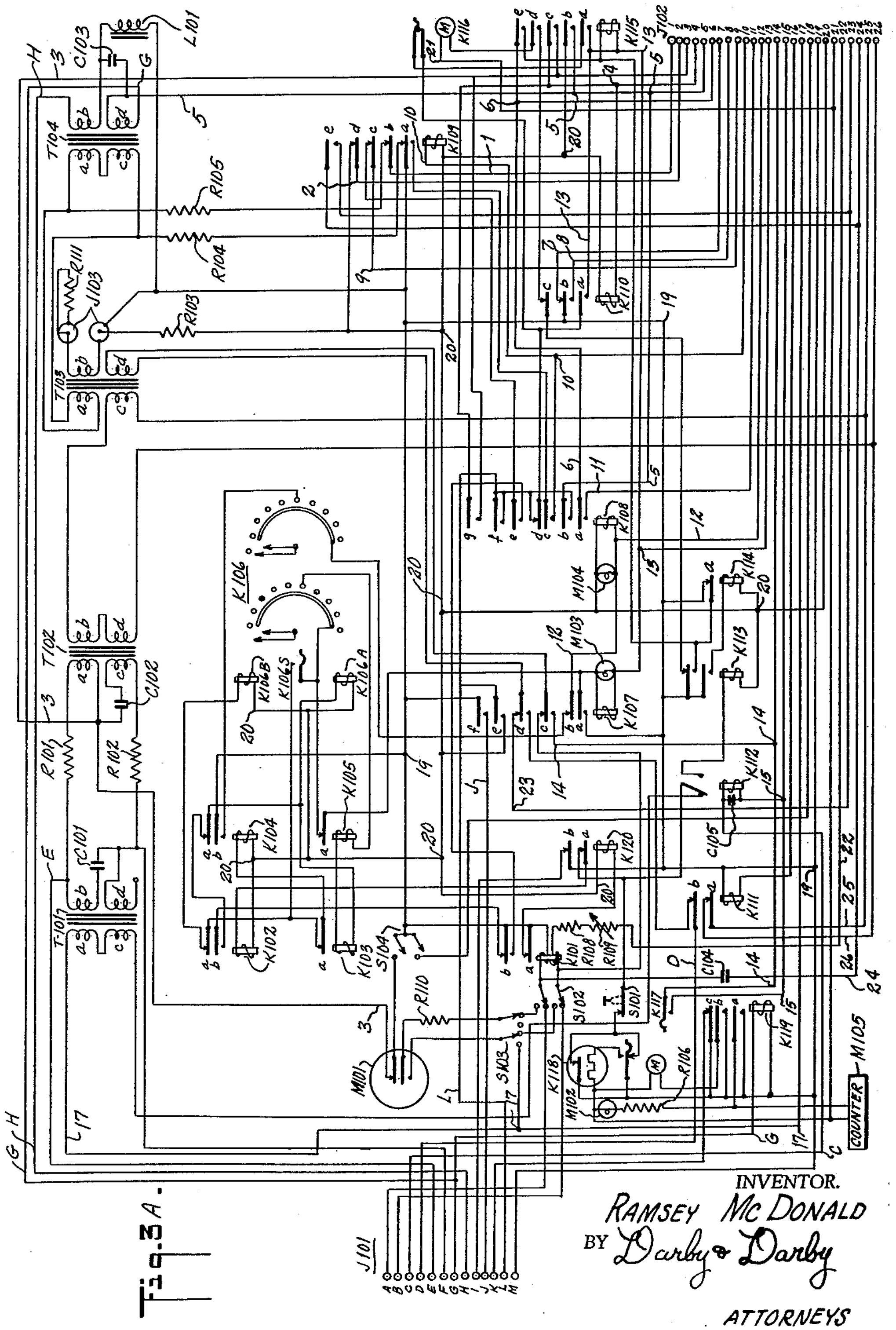
Figure 3B:
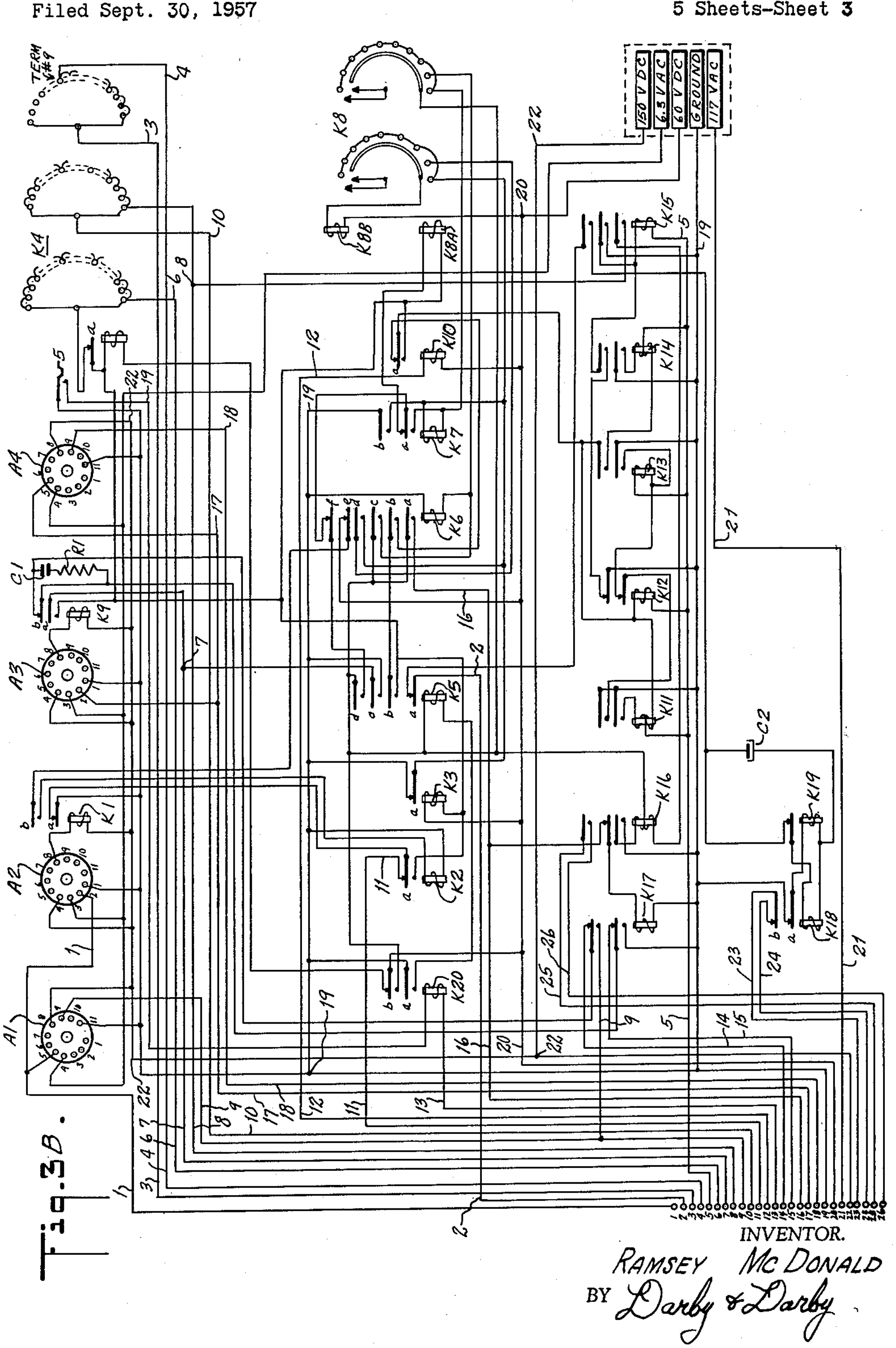

Details of the radio telephone termination equipment 13 are shown in the circuit diagrams of FIGS. 3A and 3B. It will be understood that conventional telephone mobile-to-fixed two-way radio-telephone communication equipment may be utilized in the present system and accordingly the details of such equipment will not be explained. Two-way radio installations which may be used in the present system, are:

"Dumont" MCA 101–C
"Dumont" MCA 301–B
"Dumont" MCA 401–C
"Dumont" MCA 351
"Dumont" MCA 151
"Dumont" MCA 156, or
"Dumont" MCA 356 for mobile station installations and

"Dumont" MCA 151
"Dumont" MCA 351
"Dumont" MCA 451
"Dumont" MCA 152, or
"Dumont" MCA 352 for base station installations, all manufactured by Allen B. Du Mont Laboratories, Inc., Clifton, New Jersey.

The power supply utilized for the present invention is of conventional type and for simplicity will be indicated only by blocks in the schematic circuit diagrams.

The details of the essential parts of the radio-telephone termination equipment are shown in FIGURES 3A and 3B. It is believed that this equipment will best be understood if it is explained in the order in which each part comes into operation in the course of various types of calls. The first type of call to be considered will be a call from a subscriber of the telephone system central exchange to a mobile radio-telephone receiver-transmitter. This particular type of call was also possible in radio-telephone systems according to the disclosure in my U.S. Patent No. 2,722,598. However, improvements and additions have been made to the system which render the handling of such calls somewhat different as was previously pointed out, and as will be observed from the following description.

*Call from telephone exchange to mobile station*

Terminals A and B of connector J101 in FIGURE 3A are connected to a pair of conventional telephone land lines which are, in turn, connected to the telephone exchange selector level bank.

This pair of wires is utilized only for incoming calls to a mobile station of the radio-telephone system. When these wires are not in use, the telephone central exchange presents an open circuit at terminals A and B. Terminals A and B are connected through switch S102 to respective halves of a split winding of a relay K101. The center leads of the split windings of relay K101 are conneted respectively to ground lead 19 and through lead 22 to a 150-volt D.C. terminal of the power supply 28 (in FIG. 3B). Connected in series with relay K101 are a resistor R108, and a variable resistor R109. The resistor R108 may be of the order of 1,000 ohms or more, so that variations in the line resistance from terminals A and B to the telephone system central exchange will be relatively insignificant compared with the resistance of resistors R108 and R109. Thus, weather conditions or other influences causing a variation in the line resistance of the wire pair to the telephone system central exchange will not interfere with the proper operation of relay K101.

Variable resistor R109 is provided so that the current in relay K101 may be adjusted to provide optimum operation of this relay. The switch S102 is shown in its normal position and it will be turned to its other position only for test purposes.

When a subscriber of the telephone system central exchange desires to call a mobile station of the radio-telephone system he will dial a number, the first digit or digits of which will cause the telephone system central exchange dial equipment to establish a connection between the subscriber's telephone and the line to the radio-telephone termination equipment connecting with terminals A and B of connector J101. For the purpose of illustration, it will be considered that two digits, one and six, dialed by a telephone system central exchange subscriber will cause the terminals A and B to be seized by the telephone system central exchange dial equipment.

At this time, a closed circuit line will be presented to the terminals A and B by the central exchange and relay K101 will operate. Contact **K101*a* of relay K101 will be opened, disconnecting the ground circuit from a relay K120, and causing the release of relay K120, which is the only relay in the termination equipment which is normally operated during standby conditions. Relay K120 is connected through lead 20 to a 60-volt D.C. terminal of power supply 28 (FIG. 3B). Contacts K101*b* of relay K101 are also operated when the lines A and B are seized causing normally opened contact K101*b* to close and normally closed contact K101*b*** to open. This supplies the ground circuit, and interrupts the ground circuit, for respective relays which will be discussed at a later point in the explanation.

When relay K120 is released as lines A and B are seized, this relay causes contact **K120*a* to close, supplying a ground connection from ground lead 19 through the normally closed contact of a thermal timer K118, and a switch S101 to slow release relay K102, which is supplied with voltage through lead 20 to the 60-volt D.C. terminal of power supply 28 in FIG. 3B. Thus relay K102** will operate in turn when lines A and B are seized by the telephone system central exchange equipment.

The *b* contact of relay K120 is also closed when this relay releases. This contact supplies a ground connection to terminal I. As shown, in FIG. 1, terminal I of the radio-telephone termination equipment is connected to the telephone system central exchange or other location where supervisory personnel are available, at which point a light, buzzer or other similar indicator will be operated by the ground connection supplied through this lead. It will be noted that the indicator will be operated whenever the lines A and B are seized, or if the power at the radio-telephone termination equipment should fail. Thus, the continuous presence of a ground at terminal I for a substantial period of time, five minutes for example, would indicate that some malfunction of the equipment existed.

Referring now to the operation of relay K102, contact **K102*a* will be closed preparing a circuit from the normally closed contact K101*b* through contact K102*a*, and the normally closed contact K104*b* of a further relay K104 to one terminal of the stepping or motor winding K106A of a ten-position, two-level stepping switch K106. Thus, as relay K101 is pulsed by further digits of the dial signal from the telephone system central exchange subscriber, pulses will be supplied to the stepping winding K106*a* to operate the stepping switch K106, since the other terminal of winding K106*a* is connected through lead 20 to the 60-volt D.C. terminal of power supply 28 in FIG. 3B. Dial pulse signals follow the same path to a slow release relay K103 which is operated in response to the first of these pulses. Relay K103 is supplied with voltage from the 60-volt line 20**.

The *b* contact of relay K102 is opened when this relay operates, thus opening the circuit from ground lead 19 through the home position switch **K106*s* of stepping switch K106 to a terminal of homing or reset winding K106*b* of the stepping switch K106. Thus, while relay K102 is operated stepping switch K106** is prevented from resetting.

Relay K102 is a slow release relay, indicated schematically by the black end opposite the contacts. The delay of this slow release relay is such that it will not release between pulses of a single digit of a dial pulse train. However, the slow release relay may release in the interval between digits of a dial pulse train.

From the foregoing explanation, it will be noted that contrary to the system provided in my previous Patent No. 2,722,598, the seizing of terminals A and B of the telephone termination equipment does not cause the base-station transmitter of the system to be activated.

After the connection has been established to the telephone termination equipment, it is necessary for the telephone system central exchange subscriber to dial one addititonal digit before the radio system is placed in operation. For the purpose of illustration the number "6" has been selected.

A substantial advantage is provided by this improvement, in that the base station transmitter cannot be activated by accidental short-circuiting of the pair of leads 15 from the radio-telephone termination equipment of the telephone system central exchange. In addition, the necessity for dialing the additional digit reduces the likelihood of reception of wrong numbers at the mobile stations.

Assume now that the telephone system central exchange subscriber continues in the placing of his call by dialing 6. Each pulse of this digit will be followed by relays K101 and K120. On the first pulse of this digit relay K103 will be supplied with a ground connection through the circuit previously explained, and on each pulse of this digit stepping switch K106 will be stepped one position until on the sixth pulse it reaches the sixth position. The sixth position of the first bank of stepping switch K106 is connected to supply the ground connection to a relay K105. Relay K105 is thus operated on the sixth dial pulse of the third digit dialed by the telephone system central exchange subscriber. On the second bank of the stepping switch K106 a ground circuit is prepared to relay K108.

At the end of the third digit and after sufficient time has elapsed for relay K103 to release, a ground connection is supplied through contact K103*a* of this relay to operate relay K104. Contact *b* of relay K104 opens preventing a stepping switch K106 from being operated by further dial pulses. Contact K104*a* of relay K104 is closed supplying a ground connection through position 6 of the second bank of stepping switch K106 and normally closed contact K107*b* of a relay K107 to operate a relay K108, and incidentally, to operate an indicator light M104.

Through the same path and through lead 12 the ground connection is supplied to operate a relay K10 shown in FIG. 3B. Contact *e* of relay K108 is closed, causing a connection to ground terminal 19 to be made through the normally open contact K101*b*, contact K108*e*, normally closed contact *c* of a relay K109, and terminal 9 of connector J102 to tone generator connector A1. As will be seen from a later explanation of the tone generator, it is keyed by the connection of terminal 9 to ground. The tone generator is thus rendered operative and supplies a tone signal to terminal 2 of connector A2 for tone selector 33*a*. The tone selector 33*a* causes relay K1 to be operated upon the reception of a tone signal in a manner which will later be described.

The operation of relay K1 closes contact *b* of that relay and supplies a connection from the 60-volt D.C. terminal of the power supply 28 through lead 20, contact *e* of a relay K6 and contact K1*b* to operate relay K2. The normally open contact *a* of relay K2 closes to prepare a circuit from now open contact *a* of relay K1 to relay K3.

Contact K108*b*, closed upon the operation of relay K108, provides a connection from 60-volt line 20 through lead 5 to provide voltage at one terminal of each of the relays K11, K12, K13, K14 and K15 in FIG. 3B. Lead 5 is also connected in FIG. 3A to a terminal of winding T104*d* of a transformer T104, and a connection is provided through winding T104*d* of this transformer to lead G which, as may be seen in FIG. 1, is connected to the base station transmitter. Thus, upon operation of relay K108, 60 volts is applied through terminal G of connector J101 to the base transmitter and a return is provided through terminal H, through winding T104*b* of transformer T104 and a choke coil L101 to ground. In a manner which is conventional (but not illustrated), this direct voltage actuates relays at the transmitter which energize all the transmitter circuits, the transmitter being otherwise normally deenergized.

A connection is made from terminal G through the winding of relay K119 to ground, so that relay K119 is operated whenever the base station transmitter is turned on. Contact K119*a* of the relay K119 closes when this relay is operated and completes a ground connection to one terminal of the counter M105, which has another terminal connected to terminal 21 of connector J102 which is connected to the 117 volt A.C. terminal of the power supply 28 in FIGURE 3B. Counter M105 records each instance in which the relay K119 operates and thus records each activation of the base station transmitter. Since the base station transmitter is maintained operative until the call is completed, the total on the counter M105 represents the number of calls placed over the radio-telephone system.

Contact K119*a* also supplies a ground connection through resistor R106 to indicator M102, indicator M102 being supplied with 117 volt A.C. through lead 21 and is thus operated whenever the base station transmitter is operated.

Contact K119*b* of relay K119 supplies a ground connection serving to operate the motor of timer K117. The timer K117 may have a period on the order of thirty seconds.

A second timer K118 is provided which may be of the thermal type. When the timer K117 operates at the end of thirty seconds or other predetermined period, timer K118 is started. The use of a mechanical timer K117 to start the thermal timer K119 avoids the necessity of a cooling off period for the timing system which is normally necessary with thermal timers.

The timer K118 may have a period of two and one-half or three minutes, for example, and serves to limit the time of calls made from a telephone subscriber to a radio-telephone mobile station. When the timer K118 operates, the ground connection is broken leading through contact K120*a* to relay K102. Relay K102 is therefore released which causes the system to be restored to standby conditions in a manner which will later be explained.

As previously described, relay K108 also causes dial tone generator 32*a* connected to connector A1 to operate. The tone output from this generator at terminal 5 of the connector A1 is connected to the tone selector 33*a* and also is connected back through terminal 1 of connector J102, contact K109*b* of relay K109 and resistor R105 to winding T103*a* of a transformer T103. The other terminal of this winding is connected through resistor R104 and contact K109*a* of relay K109 to ground. Output winding T103*b* of relay T103 is connected through normally closed contacts K107*c* and K107*d* of relay K107, through terminal 23 of connector J102 and normally closed contact K18*b* in FIGURE 3B and back through terminal 24 of connector J102 to the terminals A and B, which are connected through lines 15 to the telephone system central exchange and from thence to the central exchange subscribers telephone. A revertive tone from the tone generator is therefore heard by the calling telephone central exchange subscriber.

At the same time, tone is impressed on the primary T104*a* of the transformer T104 whose secondary T104*b* and T104*d* is coupled to terminals G and H, whereby tone is supplied to the fixed radio transmitter and is thus transmitted to all mobile receivers within the system.

The operation of relay K108 also closes contact K108c which prepares the ground circuit through contacts K109a (when energized) to the winding of relay K109, so that a holding circuit is prepared to become effective to retain the relay K109 in the operating position once it has operated.

Operation of relay K108 opens contact K108d which disables relay K115 by disconnecting its winding from the source of power (lead 20).

Contact K108f of relay K108 is also closed by the operation of this relay and provides a connection from the 60 volt 20 line to terminal L of the connector J101. It will be noted that terminal L and terminal K of the radio-telephone termination equipment are connected by wire pair 24 to station identification repeater 25 which is arranged to transmit a recorded voice signal at the end of each conversation in the radio-telephone system.

At this stage, the calling telephone system central exchange subscriber hears a revertive dial tone; the base station transmitter is operative; a dial tone is applied to the transmitter audio input and is being radiated to mobile stations. The calling subscriber may now designate which of the mobile stations he wishes to contact by dialing the number assigned to that particular station. As many as 99 numbers may be provided by the use of two digits in the present system and ordinarily two digits will be sufficient to identify all stations. However, if it is desired to use a greater number of digits the system may readily be modified for this mode of operation.

When the calling subscriber dials further digits, the direct current supply to relay K101 is interrupted a number of times corresponding to the digit being dialed. As relay K101 is deenergized relay K120 is energized, and at the same time, normally open contact G101b is opened interrupting the path for the ground circuit through lead 9 to the tone generator 32a, thus causing an interruption of the tone for each pulse of a dialed digit. As the tone is interrupted relay K1 is released. All other operated relays of the system are unaffected due to their being slow release relays or operated by slow release relays.

The first pulse of this fourth digit of the dial train in releasing relay K1 closes contact K1a causing a ground connection to be made through the normally open contact K2a, through the normally open contact K10a to one of the split windings of relay K11. K11, being supplied with current through lead 5 is caused to operate. Upon operation of K11 contact K11a closes completing the ground connection to the other winding of relay K11 and locking it in operated position, so long as current is supplied at lead 5.

Simultaneously, a ground connection is made to the relay of K12 causing it to operate and opening contacts K12a and K12b.

Relays K11 through K15 constitute a digit counting circuit which commences to operate upon the receipt of the first mobile station designating digit, in this case the fourth digit dialed by the telephone central exchange subscriber. These relays operate in sequence to count a total of two digits, at the end of which, relay K15 operates to perform certain functions desired to be performed at the end of the complete dialing operation. If the system were to be designed to use more than two digits for mobile station designation, the chain of counting relays K11 through K15 could simply be extended to count the desired number of digits.

Each pulse of the fourth dialed digit also causes the ground connection to be completed through contact K1a and normally open contact K2a to the stepping switch motor of rotary stepping switch K4 having 25 contacts. The motor of stepping switch K4 is also connected through normally open contacts K20b to the 60 volt D.C. line 20. Thus each dial pulse of the fourth digit causes stepping switch K4 to step one position.

At the end of the fourth digit (the first digit of the mobile receiver designator) sufficient time will elapse for relay 12 to release. Contact K12a will thereby be closed to provide a ground connection through contact K11b and K12a to actuate relay K13. Contact K13a will also be closed and will provide a continuous ground connection to relay K13, thus locking it in the operated position so long as current is supplied through lead 5.

The fifth digit dialed by the telephone system central exchange subscriber (the second digit of the mobile receiver designator number) will cause stepping switch K4 to be stepped further for each pulse of the second digit. This fifth and last digit also causes a ground connection to be made through contact K1a, normally open contact K2a, normally open contact K10a and contact K13b to operate relay K14 which is thereupon supplied with a continuous ground connection to a second winding by the closing of contact K14a. When sufficient time has elapsed after the last pulse of this fifth digit for relay K12 to release, a ground connection is supplied through contact K12b, and contact K14b to operate relay K15. Relay K15 is retained in the operated position by the closing of contact K15b so long as current is supplied to relay K15 through lead 5.

Contact K15c closes on the operation of relay K15 at the end of the last digit to be dialed and provides a connection to the 60 volt D.C. terminal of the power supply 28 through lead 20, contact K109d in FIGURE 3A, through terminal 2 of connector J102, normally closed contact K5a, contact K15c and capacitor C2 to one terminal of the winding of relay K19. The other terminal of this winding is connected through contact K18a of a relay K18 to ground lead 19.

The capacitance of capacitor C2 is sufficiently high so that its operating current at the prescribed voltage will be sufficient to operate relay K19 until the capacitor C2 approaches its charged condition.

A current through relay K19 will gradually diminish as capacitor C2 becomes charged and at some time before it becomes fully charged K19 will release, thereby closing contact K19a. At this time capacitor C2 will have sufficient charge so that its discharge current through the winding of relay K18 will be sufficient to operate this relay, thereby opening contact K18a, interrupting ground connection to relay K19 and also opening contact 18b.

Contact K18b is in series with the revertive tone circuit supplying revertive tone to the telephone central exchange subscriber. After the capacitor C2 has partially discharged, discharge current will be insufficient to retain relay K18 in operating condition and the circuit will be restored to its original position. This cycle will be repeated to provide the interrupted revertive tone to the telephone subscriber. Thus the dial tone heretofore heard by the telephone subscriber will now be replaced by a cyclically interrupted tone signal indicating that the mobile station called is being signalled. Relays K18 and K19 may be adjusted to provide desired off and on times for the ringing tone and may, for example, be adjusted for three seconds of tone with one second of no tone, thus providing a distinctive and unmistakable indication to the telephone subscriber that a mobile subscriber is being signalled.

*Mobile station answers*

The previously described condition will continue until the mobile station answers. Mobile stations will answer the signal by pushing a press-to-talk switch thereby activating the mobile transmitter. The carrier signal from the mobile transmitter is received at the base station receiver and operates a carrier operated relay impressing a ground on terminal E.

The carrier operated relay is not shown as a part of a radio-telephone termination equipment, but is a conventional part of the base station receiver equipment. This ground on terminal E is connected through the primary T102a of transformer T102 and contact K108g to operate relay K110.

The operation of relay K110 closes normally open contact K110*b* impressing a ground through terminal 8 of connector J102 and through the second level of stepping switch K4, back through terminal 10 of connector J102 to operate relay K109.

The operation of relay K109 opens its contacts *a* and *b*, which removes the radio dial tone from the input T104*a* of transformer T104 and thereby cuts off the tone signal from the base station transmitter terminals G and H. Also, operation of relay K109 opens contacts K109*c* and disconnects ground from the keying terminal 9 of the connector A1, thus disabling the tone generator 32*a* connected to connector A1.

When the tone generator is cut off relay K1 is deenergized. After a short time delay, relay K2 is also deenergized so that a ground connection is supplied through contacts K1*a*, normally closed contact K2*a*, terminal 11 of connector J102, contact K108*a*, terminal 6 of connector J102 and the first bank of stepping switch K4 and contact K4*a* to stepping switch K4, thus restoring it to its normal or "home" position where the connection through the first bank will be interrupted to retain the stepping switch at its normal position. At this point, a call from the telephone central exchange subscriber to a mobile station of the radio-telephone system is complete for conversation and the stations can talk back and forth.

*Termination of call*

When the calling subscriber hangs up at the conclusion of the call, the direct current circuit for relay K101 is broken, thereby releasing relay K101. Contact K101*a* operates relay K120 thereby opening contact K120*a*, releasing relay K102 (after its normal time delay).

The release of relay K102 closes contact K102*b* providing a ground connection through the "home" position switch K106S of stepping switch K106 and contact K102*b* to the reset winding K106B of stepping switch K106. Stepping switch K106 therefore returns to its "home" or normal position breaking the ground circuit through the second bank of stepping switch K106 and contact K107*b*, thereby releasing relay K108 (after its predetermined time delay). The delay of relay K108 is adjusted to be slightly longer than the delay of the other slow release relays.

Upon the release of relay K108, contact K108*b* is opened breaking the circuit supplying voltage for the operation of the transmitter operating relays, thus deenergizing the base transmitter.

Contact K108*b* also supplies voltage to the digit counter circuit comprising relays K11 through K15. As this voltage is cut off the digit counting circuit is reset to its initial condition.

Contact K108*c* is also open breaking the hold circuit for relay K109 allowing it to release.

The equipment is thus restored to its standby condition where only relay K120 is operated and the equipment is then ready for another call.

In a situation where the calling mobile unit fails to answer the same steps occur except that relay K110 and relay K109 are not operated because no carrier has been received from the mobile station. When the calling subscriber receives no answer he hangs up as usual. Relay K101 is thereby deenergized, K120 is operated, K102 is released, stepping switch K106 is reset and relay K108 is deenergized. Before relay K104 can release, dial tone which is keyed by the direct current circuit through terminals A and B has been cut off. Relay K1, and after a short time, relay K2, will have released. A ground connection is therefore provided through contacts K1*a*, normally closed contact K2*a*, terminal 11 of connector J102, contact K108*a*, and back through terminal 6 of connection J102 to the first bank of stepping switch K4, causing this switch to "home" as before. The delay of relay K108 is of sufficient length to allow this operation to take place before this relay releases. When relay K108 releases, the base station transmitter is turned off, the digit counter circuit is reset and the equipment assumes its normal standby condition in readiness for the next call.

The third manner in which such a call may be terminated is for the length of the call to exceed the allotted time which is determined by the sum of the time periods of the timers K117 and K118. Timer K117 is started when the base station transmitter is activated and at the end of the period timer K117 operates to start timer K118. The time of the call is limited by the time periods of the two timers K117 and K118, which may be set to provide any desired maximum length of call. For the purpose of illustration, it will be assumed that the set period is three minutes, consisting of thirty seconds of operation of timer K117 and two and one-half minutes of operation of timer K118. At the end of three minutes, therefore, timer K118 breaks the ground connection which extends through contact K120*a* of relay K120, to relay K102.

Relay K102 is therefore released after its normal time delay and the radio-telephone termination equipment is restored to its standby condition in the same manner as previously described for the case where the telephone system central exchange subscriber hangs up after contacting the radio-telephone mobile subscriber and before the call-limiting timers operate.

*Call from mobile station to telephone central exchange subscriber*

In initiating a call from a mobile unit, the radio-telephone subscriber determines that the radio channel is clear by listening in the ear piece of his hand set. Reception of a loud rushing note indicates that the channel is clear for his call. The calling radio-telephone subscriber then dials a predetermined digit on his telephone hand set. For the purpose of explanation, the digit will be presumed to be "9." Dialing the digit 9 activates the mobile station transmitter and produces 9 pulses of dial tone which is transmitted by the mobile transmitter.

Reception of radio carrier from the mobile transmitter by the base station receiver operates the carrier operated relay to place a ground on terminal E. This ground is fed through the primary T102*a* of transformer T102 and terminal 3 of connector J102 to the third bank of stepping switch K4. The 9 dial tone pulses from the mobile unit pass via transformer T101 through terminal 17 to the input terminal 2 of connector A3, which is connected to tone selector 33*b*. Tone selector 33*b* responds to the dial tone frequency of the mobile station to actuate a relay K9. In this way each pulse of dial tone causes relay K9 to be operated, and the relay K9 is thus operated nine times in response to the first digit dialed at the mobile station.

As each pulse of dial tone is received a ground connection is applied through contact K5*c* of a relay K5 and contact K9*a* of one terminal of the motor of stepping switch K4; the other terminal of the stepping switch motor is connected through normally closed contact K20*b* of a relay K20 to the 60 volt supply line 20. Thus, stepping switch K4 is stepped one position for each incoming pulse of dial tone and accordingly is stepped to position nine by the receipt of the initial digit from the mobile transmitter.

The third bank of the stepping switch K4 has its ninth position contact connected through terminal 4 of connector J102 to operate relay K110. The ground connection to the third bank arm of stepping switch K4 is supplied through terminal 3 from a carrier operated relay of the receiver as previously explained.

When relay K110 operates, contact K110*a* is closed, supplying a connection from 60 volt line 20 through contact K108*d* and contact K110*a* to one terminal of relay K115. The other terminal of relay K115 is connected through contact K113*b* to ground. Relay K115 is therefore operated upon the operation or relay K110. The same circuit which supplies the 60 volt connection to relay K115 also provides a connection to one terminal of the winding of relay K107. The other terminal of this winding is connected through contact K105*a* to ground. This relay K107 and, incidentally, indicator light M103, connected parallel, are operated.

Simultaneously with the operation of relays K115 and K107 relay K20 is operated by the connection of the 60 volt supply line through the same path provided to relays K115 and K107. The other terminal of the winding of relay K20 is connected to the ground through "home" position switch K4*s* of stepping switch K4. Closing of contacts K20*a* and K20*b* of relay K20 supplies a complete circuit for the winding of relay K5, thus operating this relay.

Contact K115*b* of relay K115 also closes at this time to supply 60 volts to terminal G which, as previously explained, activates the base station transmitter. Closing of contact K115*b* also prepares the counting circuit consisting of relays K11 through K15 for operation. Although this counter circuit operates on calls from mobile stations to telephone systems central exchange subscribers, the counting circuit does not perform any function as it is unnecessary for this type of call.

The 60 volt D.C. supply to terminal G also operates relay K119 which starts the operation of timers K117 and K118 as previously explained.

The closing of contact K115*c* provides a by-pass across terminals 3 and 4 independent from the connection prepared by the third bank of the stepping switch K4, whereby relay K110 continues to be energized in response to reception of a carrier signal at the base station receiver despite the subsequent return of stepping switch K4 to the "home" position. The closing of contact K115e causes a ground connection to be made from ground lead 19 through contact K114*a*, K115*e* and terminal 6 of connector J102 to the first bank of stepping switch K4, thereby causing stepping switch K4 to reset to "home" position.

Closing of contact K115*d* provides a ground connection from ground lead 19 through normally closed contact K113*b*, contact K110*c* and contact K115*d* to the time K116, thus causing this timer to operate whenever relay K110 is released due to cessation of reception of carrier by the base station receiver. Timer K116 automatically resets when it is deenergized and is of a common type which opens its contacts after a predetermined and preferably adjustable interval following initiation of its energization. As will be described below, this apparatus is to restore the system to normal standby condition after the calling mobile radio-telephone subscriber hangs up without completing a call. It may be set for any interval, preferably being adjusted to approximately a thirty second interval.

After dialing the first digit the mobile radio-telephone subscriber is connected to the telephone system central exchange by the operation of relay K107. A closing of contact K107*d* connects one terminal of the winding T103*d* of transformer T103 through contact K111*b* to terminal D leading through outgoing lines 16 to the telephone system central exchange.

The closing of normally open contact K107*c* connects the other terminal of winding T103*d* through terminal 14 of connector J102, normally closed contact K17*b*, contact K9*b* and normally closed contact K17*a*, back through terminal 15 of connector J102 through the winding of relay K112 to terminal C, to which is connected one of the outgoing land lines to the telephone system central exchange. The winding of relay K112 is by-passed by condenser C105 so that voice calls in this circuit will not cause operation of relay K112. Contact K9*b* is shunted by a capacitor C1 in series with resistor R1 to prevent arcing of this contact and to provide a proper pulse to actuate the dialing equipment at the telephone system central exchange. The telephone power terminals C and D are directly connected to winding T103*b* of transformer T103. This complete loop to the central telephone exchange is seized and the central exchange dial tone is then fed back on this line and is then transmitted through transformer T103 and transformer T104 to terminals G and H, whereby this central exchange dial tone is transmitted back to the calling mobile subscriber.

The transformers T101, T102, T103 and T104 form a hybrid system whereby the radio link consisting of separate send and receive channels is properly connected to the two wire circuits to the telephone exchange.

When the mobile subscriber hears this central exchange dial tone he then dials the digit of the number to be called via the central exchange. This train of radio dial tone pulses appearing on terminals E and F of the radio-telephone termination equipment is transmitted through transformer T101 to the tone selector 33*b* connected to connector A3 in FIGURE 3B to correspondingly actuate the relay K9 and open its contact K9*b* in correspondence with the incoming dial pulses. The operation of relay K9 thus correspondingly interrupts the direct current path between terminals C and D so that the pulses dialed on the mobile station effectively pass to the central exchange as interruptions in the telephone line current. This causes the central exchange equipment to select and ring the desired called number.

The foregoing description of the operation of the termination equipment during a call from a mobile station to a telephone system central exchange subscriber presumes that the second digit dialed by the mobile radio telephone subscriber is one of nine digits which identifies a call to a telephone system central exchange subscriber. One of the ten possible digits which might be dialed is reserved as a code number to indicate that the mobile radio-telephone subscriber is making a call to another mobile station. For the purpose of explanation, the code number "9" is selected in the present example to indicate such calls.

It will be noted that a stepping switch K8 is provided (in FIGURE 3B) which has each of its two banks wired so that all positions with the exception of the ninth position are strapped together. The ninth position at each of the two banks is wired separately. It is a function of the stepping switch K8 to distinguish between calls destined for a telephone system central exchange subscriber and those calls intended for mobile station of the system (designated by a second digit "9"). The stepping switch motor winding K8*a* is actuated by pulses from the contact K9*a* of relay K9. The motor winding K8*a* is further provided with a return only through normally open contact K7*a*, contact K6*f*, contact K5*d* and normally open contact K20*b*. Thus the stepping switch motor winding K8*a* is operative only after relay K20 and relay K5 have been actuated at the end of the first digit dialed by a mobile radio telephone subscriber. In other words, the stepping switch K8 operates only on the second digit of a number dialed by a mobile radio-telephone subscriber.

The contact ring of the second bank of the starting switch K8*a* is connected through normally open contact K20*b* to the 60 volt supply line 20. Thus, when any other number than "9" is dialed, 60 volts applied to the 9 strapped contacts of the second bank of the stepping switch K8 and from thence to one terminal of the winding of the relay K7. The other terminal of the winding of the relay K7 is connected through the contact K3*a* to ground. Relay K3 operates at the end of the second digit dialed by a mobile radio-telephone subscriber. Thus, if this digit is any other digit than 9, the relay K7 will operate.

A ground holding circuit is supplied for relay K7 through contact K7*b*, and a 60 volt holding connection is applied to relay K7 through normally open contact K7*a*, contact K6*f*, contact K5*d*, and normally open contact K20*b*. Thus, while relay K20 and relay K5 are operated, relay K7 will be held in its operated position. When relay K7 operates, normally closed contact K7*a* is opened interrupting the circuit to the motor winding K8*a* of stepping switch K8 thus preventing its further operation.

When relay K3 releases at the end of the second digit a ground connection is supplied through the nine strapped terminals of the first bank of the stepping switch K8 and the ring contact of the stepping switch to the reset winding K8*b* of the stepping switch K8, thus causing the stepping switch K8 to reset.

As will be seen from the above explanation, the second digit dialed by a mobile station determines whether the call shall be directed to a telephone system central exchange subscriber, or whether it shall be directed to another mobile station. In the first instance the relay K7 is operated, while in the second instance the relay K6 would be operated as will later be explained.

It will be noted that timer K117 has a contact which is connected between terminals 14 and 15 of connector J102 and thus short-circuits the dialing contact K9*b* of relay K9. Therefore, after a certain time has elapsed (in this example thirty seconds) from the energization of the base station transmitter the dialing mechanism will be short-circuited so that no further dial pulses may be transmitted.

This period of time is selected to give ample time for the mobile radio-telephone subscriber to dial his party but serves to prevent spurious actuations of dialing relay K9 due to ensuing voice conversation after thirty seconds has elapsed. Thus timer K117, in addition to allowing a cooling off period for thermal timer K118, also provides a second function by disabling the mobile radio-telephone dialing circuit thirty seconds after the call is commenced.

When the mobile radio-telephone subscriber has completed the dialing operation his transmitter ceases to operate and relay K110 releases, thus starting timer K116. Assuming timer K116 to be set for thirty seconds, time for several rings of the telephone system central exchange subscriber will be allowed. In any case, the mobile radio-telephone subscriber may cause timer K116 to be reset by activating his transmitter and thus causing relay K110 to operate to reset timer K116.

*Telephone subscriber answers*

When the called telephone system central exchange subscriber answers, this is indicated from the central exchange by a reversal of line current to terminals C and D. This reversal causes polarized relay K112 to operate supplying a ground connection to relay K113 and causing it to operate. Contact K113*a* closes to operate slow release relay K114. At the same time, relay K112 breaks the ground connection through the windings of T101 and terminal 17 of connector J102 to the tone selector connected to connector A3 in FIGURE 3B. The tone selector is therefore disabled to prevent the operation of relay K9.

The operation of relays K113 and K114 causes the ground connections which were previously supplied to various relays (K115 for example) to be transferred from the contact K114*a* of slow release relay K114 to the normally open contact K113*b* of quick release relay K113. At this point, the circuit is set up for conversation, relays K115, K107, K20, K5, K7, K112, K113, K114 and K119 are operated. Relays K108 and K109 are disabled and cannot be operated by a call originating at a fixed subscriber. In addition, contact K107*f* is closed supplying a ground connection to terminal J which is connected by a land line to the telephone system central exchange and causes a busy signal to be placed on the telephone lines leading to incoming terminals A and B of the radio-telephone termination equipment.

Each time the mobile radio-telephone transmitter ceases to operate, relay K110 releases, closing contact K110*c* and normally energizing the motor circuit of timer switch K116. However, if the telephone subscriber has answered, polarized relay K112 has operated and energized relay K112 to break the ground return to motor K116 thus deactivating the associated timing circuit.

The circuit is returned to normal standby when the central exchange subscriber hangs up. This reverses the line current to terminals C and D restoring realy K112 to normal, which, in turn, releases relay K113 to remove the ground return from relay K115 by opening normally open contact K113*a*. Contact K115*c* thus opens to deenergize relay K110 and open its contacts K110*a*. Contacts K115*a* open and since contact K105*a* is already opened, the energizing circuit for relay K115 remains open preventing further operation of K108.

The releasing of relay K113 also opens its contacts K113*a* which interrupt the circuit for relay K114. However, relay K114 is a slow release relay and does not release until after relay K115. Hence, the later closing of contacts K114*a* does not prevent relay K115 from releasing. The release of relays K110 and K115 releases all other relays in the circuit, with the exception of K120 and resets timers K116 and K117, to restore the termination equipment to normal standby condition.

Where telephone exchanges to which the termination equipment is connected do not use reverse line current, relays K112, K113 and K114 may be eliminated and the ground return of relay K115 may be permanently connected. In this case, all calls involving mobile units are disconnected by timer switch K116 after the preset time has elapsed.

It will be noted that upon a call from a mobile radio telephone subscriber to a telephone system central exchange subscriber, the timers K117 and K118 are operative to limit the length of the call to a predetermined time period.

The call is terminated when the timer K118 operates to break the ground connection through the contact of relay K112 and release relay K113. When relay K113 is released in this fashion the circuit proceeds to restore itself to standby condition in the same manner as if the telephone system central exchange subscriber had hung up.

A somewhat different arrangement of relays K112, K113 and K114 can be made whereby the above described timing mechanism does not limit an outgoing long distance toll call to a predetermined period. It may be undesirable that the parties be cut off on a long distance toll call before their three minutes time (from the time the called party answers) has expired or that the parties be cut off before they have finished talking, thus requiring the time-consuming operation of re-establishing the long distance connection. This may be accomplished by supplying power from lead 20 through an additional normally open contact of relay K120 and an additional left hand contact of relay K112 to the output of timers K117 and K118 to supply power at this point regardless of the operation of timers K117 and K118.

The elimination of the timer circuit on long distance calls depends upon the fact that on such calls no line reversal occurs at terminals C and D. This is the normal mode of operation of telephone system dial exchanges. The relay K112 will not operate on a long distance call. A long distance toll call will therefore not be terminated upon the operation of timer K118 but will be controlled solely by the operation of timer K116. That is, so long as the mobile radio telephone station continues to transmit at intervals less than the predetermined time period of time K116, the telephone conversation will not be terminated.

*Calls between mobile radio telephone stations*

A primary advantage of the present system over that described in my U.S. Patent No. 2,722,598 is that in the present system mobile radio telephone subscribers may not only send and receive calls to and from telephone system central exchange subscribers, but may also call, by direct dialing, other mobile radio telephone subscribers.

To make a call to another mobile radio telephone subscriber the first radio telephone subscriber first proceeds as he would in making a call to a telephone subscriber. That is, he picks up his handset and listens for the rushing noise which indicates that the channel is not in use and thus available for his call. He then dials 9 (or some other selected number) to establish a radio circuit to the base station.

Upon the receipt of the dial signal the radio telephone termination equipment functions in the same manner as before. The base station transmitter is turned on and a connection is made from the receiver and transmitter at the base station to the land line telephone wires connecting terminals C and D to the telephone system central exchange.

The mobile radio telephone subscriber must then proceed differently than in the case of a call to a telephone system central exchange subscriber. He must then dial a selected code number which in the present example is indicated as the single digit 9. This second digit identifies the call as a call to a second mobile radio telephone subscriber. Obviously the code number selected should be a dummy number for the telephone system central exchange. In other words, the number selected, in this case 9, should never appear as a first digit of a number used in the telephone system central exchange.

The operation of the termination equipment upon the dialing of this second digit is the same as previously explained except for the operation of stepping switch K8. It will be noted that all contacts of both banks of the stepping switch K8 are wired together except for the 9th position contact. Thus all calls from mobile stations in which the second digit is other than 9 are identified as calls to telephone system central exchange subscribers. Calls in which the second digit is 9 are identified as calls between mobile stations and the function of the termination equipment is accordingly different.

Accordingly the explanation of the function of the equipment which is the same, namely, the dialing of the two digits by the mobile station, will not be explained. The explanation of a call between mobile stations will be commenced with the end of this second digit, it being understood that the second digit in this case is 9. However, to summarize the condition of the termination equipment at this point it should be noted that the stepping switch K4 has returned to its home position. Relays K110, K115, K107, K20, K5 and K3 are operated.

When the stepping switch K8 reaches the 9th position a connection is made from the 60-volt line 20 through normally open contact **K20*b* of relay K20 and through the 9th position of the second bank of stepping switch K8 to operate relay K6. The closing of contact K6*c* provides a holding circuit for relay K6**.

The closing of contact **K6*a* provides a connection from the 60-volt line 20 through normally open contact K20*b*, contact K6*a* and through terminal 16 of connector J102 to operate relay K111**.

The opening of contact **K111*a* disconnects secondaries T102*b* and T102*d* of transformer T102 from primary T103*c* of transformer T103**. Thus at this stage of operation the signal received by the receiver is not coupled to the transmitter. This is necessary in order that the dial tone which is transmitted by the calling mobile radio telephone subscriber not be transmitted by the base station transmitter. Rather it is necessary that the base station transmitter transmit its own type and frequency of dial tone to which the mobile stations are responsive. Normally the dial tone frequency transmitted by the base station transmitter will be different from the dial tone frequency transmitted by the mobile radio telephone stations.

The opening of contact **K111*b*** breaks the previously established circuit to the telephone central exchange since this circuit will not be required for mobile-to-mobile communication.

The closing of contact **K6*a* of relay K6 also operates relay K17 by supplying a connection to the 60-volt line through contact K16*b* of relay K16**.

The operation of double-throw contacts **K17*a* and K17*b* of relay K17 serves to disconnect contact K9*b* of relay K9 from terminals C and D of connector J101 where it was previously utilized to produce dial pulsing on the wire pair to the telephone system central exchange. The contact K9*b* is connected instead by double-throw contacts K17*a* and K17*b* to supply a ground connection to key tone generator 32*a* through terminal 9 of connector A1. Thus the reception of tone signals from the calling mobile station causes the operation of relay K9, which in turn pulses tone generator 32*a*** to transmit a tone signal over the base station transmitter.

At the end of the second digit dialed by the calling mobile radio telephone station the calling mobile station transmitter will go off the air. At this time relay K110 will release causing timer K116 to commence to operate. However, the timer will be reset when another digit is dialed, since the carrier-operated relay at the base station receiver will operate on receipt of a carrier signal when the next digit is dialed, thus operating relay K110 and resetting the timer K116.

Having dialed 9 as a second digit, the mobile radio telephone subscriber has identified his call as a call to another mobile subscriber. He may now dial the code number of any mobile radio telephone subscriber in the system. When the calling mobile subscriber dials the third digit, the base station receiver receives this signal which is selected by tone selector **33*b* and causes relay K9 to operate. The relay K9 keys the tone generator 32*a*** to transmit interrupted tone dial pulses to the mobile receivers of the system. This signal operates the decoder equipment at each mobile station in the customary manner.

Further digits dialed by the calling mobile station do not operate the stepping switch K8 due to the fact that the circuit to **K8*a* has been interrupted at contact K6*f* of delay K6. However the dial pulses are fed to the counter circuit consisting of relays K11 through K15. This circuit is made from contact K9*a* through contacts K5*b*, K6*b* and normally closed contacts K10*a* to the first relay K11** of the counter circuit.

The counter relays K11 through K15 operate sequentially to count the number of digits dialed starting with the third digit. The counting circuit counts two digits, and at the end of the fourth digit relay K15 is operated.

When the two digits of the number designating a particular mobile station have been dialed, the decoder equipment at this mobile station causes a signal to be produced at that station. A continuing signal is provided so long as the tone is transmitted by the base station transmitter. When the mobile radio telephone subscriber being called pushes his press-to-talk switch, thereby activating his transmitter, the carrier-operated relay at the base station receiver operates to place a ground potential on terminal E of connector J101. This ground potential is connected through the winding **T102*a* from transformer T102, and contact K115*c* to operate relay K110 as previously described. Normally open contact K110*b* causes a ground connection to be made through terminal 8 of connector J102 and contact K15*a* to operate relay K16. The 60-volt supply connection for relay K16 is supplied through normally open contact K20*b* of relay K20. The closing of contact K16*a* causes a ground connection to be made to a second winding of relay K16 thereby holding K16 in the operated position so long as relay K20** is operated.

Contact **K16*b* is opened by the operation of relay K16** and causes relay K17 to release. The release of relay K17 disconnects the circuit between tone selector 33*b* and tone generator 32*a*. Contact K16*c* restores the normal connection between transformers T102 and T103, connecting the receiver and transmitter at the base station. Thus the base station transmitter retransmits the signal received by the base station receiver and operates as a two-way relay station between mobile radio telephone stations of the system.

At this stage conversation may take place between respective mobile stations and the radio telephone system. At any time when the transmitters of both mobile stations are inoperative the timer K116 will commence to operate as previously explained. At the end of its predetermined period timer K116 will open the holding circuit for relay K115 (there having been no transmission by a mobile radio telephone transmitter in the interim). The opening of contact K115*c* will break the circuit from the carrier-operated relay at the base station receiver, disabling relay K110; contact K115 being open will break the circuit to relays K11 to K15 causing this counting circuit to reset.

The opening of contact K115*b* also removes the 60-volt D.C. potential from terminal G leading to the base station transmitter. This releases K119. At the same time that relay K115 is released by the operation of the timer K116, relay K107 will also be released as will relay K20. The releasing of relays K107 and K20 causes the release of the remainder of the relays in the circuit with the exception of relay K120. The circuit of the radio-telephone termination equipment is thus restored to normal stand-by condition and is prepared for another call.

In the event that the mobile radio-telephone station being called does not answer, the telephone termination equipment will be restored to normal stand-by condition by the timer K116 in the same fashion when the prescribed period has elapsed without the transmission of a carrier signal by a mobile radio-telephone station transmitter. It may be noted that the calling radio telephone subscriber may reset the timer K116 to allow a longer time for the called station to answer by pushing his press-to-talk switch thus actuating the carrier-operated relay at the base station and resetting the timer K116.

While a system has been described in which a mobile radio-telephone subscriber may dial a telephone system central exchange subscriber by dialing one predetermined digit or may dial another mobile radio-telephone subscriber in the system by dialing two predetermined digits, it is obvious that the system could be modified to provide the opposite mode of operation. That is, the system could be arranged to initiate a call between mobile stations by the dialing of a single digit while a second predetermined digit would cause this circuit to be broken down and a circuit to the telephone system central exchange established in its place. Furthermore the system could also be arranged so that one predetermined digit identified a call between mobile stations while a different digit identified a call from a mobile station to a telephone system central exchange subscriber.

From the foregoing description it has been seen that the radio telephone termination equipment, the essential details of which are shown in FIGS. 3A and 3B provides an improved apparatus for automatic dial radio telephone systems having numerous advantages over the apparatus described and shown in my U.S. Patent No. 2,722,598.

*Tone generator and selector apparatus*

Figure 4:
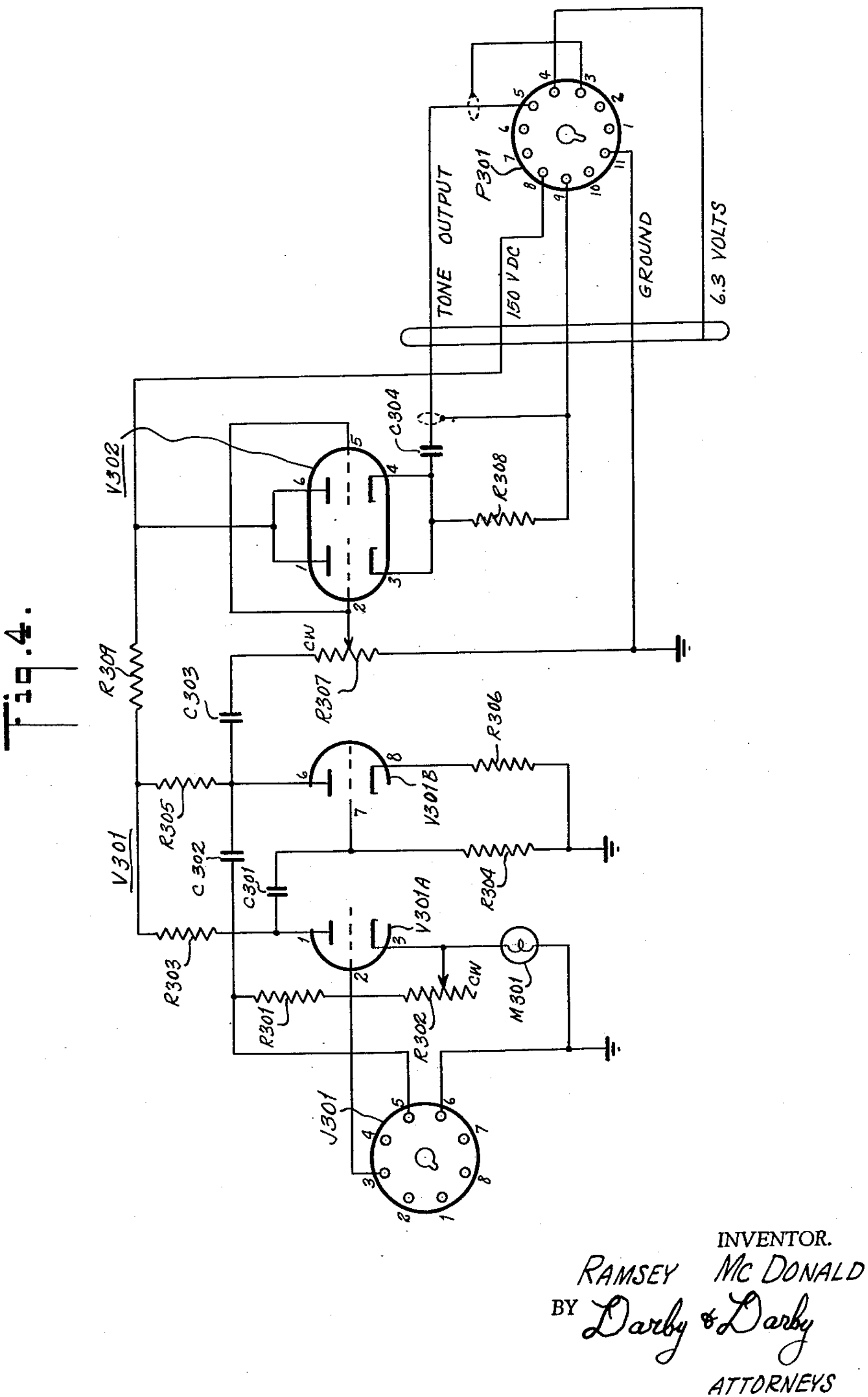
FIG. 4 is a schematic circuit diagram of a tone generator circuit forming a part of the termination equipment.
Figure 5:
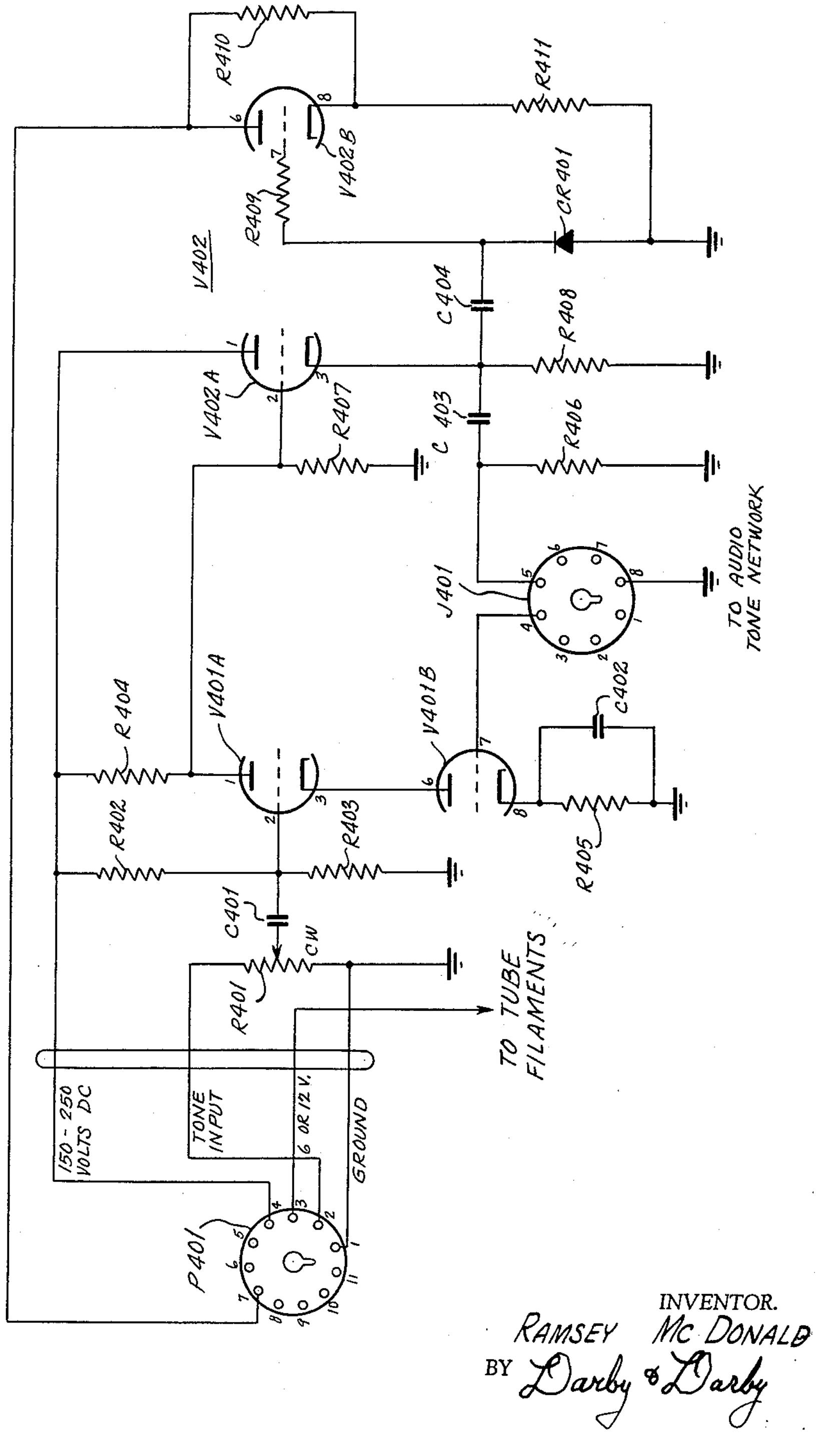
FIG. 5 is a schematic circuit diagram of a tone selector circuit forming a part of the termination equipment.

The tone generators 32*a* and 32*b* and the tone selectors 33*a* and 33*b* may consist respectively of any suitable type of audio tone generating apparatus and any suitable type of audio frequency responsive amplifier and rectifier apparatus. Examples of suitable tone generator and tone selector apparatus are shown in FIGS. 4 and 5 respectively. However, the particular construction of these circuits is not important and does not form a part of the present invention.

Identical tone generator circuits may be used for tone generators 32*a* and 32*b* and identical tone selector circuits may be used for selectors 33*a* and 33*b*. The selector circuits and the generator circuits shown in FIGS. 4 and 5 are adapted to be used with interchangeable frequency determining networks so that different frequencies may be selected simply by using different networks.

A tone generator is shown in FIG. 4 comprising a connector P301 which mates with connector A1 or A3 in FIG. 3B. 150-volt D.C. is supplied to the tone generator at terminal 8 of the connector P301. A ground connection is supplied at terminal 11 of this connector. The application of a ground return to terminal 9 of the connector serves to key the tone generator. Filament voltage of 6.3 volts is supplied to terminal 4 and the output of the generator is taken off at terminal 5 of connector P301.

Connector J301 serves as a connection to a frequency-determining network of conventional type. Suitable frequency-determining networks which may be connected to J301 are "Du Mont" Audio Tone Networks Models Nos. 88001991 through 88001999 and 88002001, all manufactured by Allen B. Du Mont Laboratories, Inc., of Clifton, New Jersey. A frequency-determining network is connected by means of a connector J301 in the grid circuit of a triode V301*a* which may be one portion of a dual triode tube V301. The triode V301*a* is coupled by means of capacitor C301 to the grid of a second triode V301*b* which may be the other portion of the dual triode V301. The output of the triode V301*b* is coupled through a capacitor C303 and variable resistor R307 to the grid of a dual triode V302. The output from the plate of V301 is also coupled back through a capacitor C302 to the frequency-determining network. Resistors R301 and R302 are provided, R302 being adjustable to adjust the bias for V301. Plate resistors R303 and R305 are provided for the respective plates of triodes V301*a* and V301*b*. A resistor R309 is provided between the plates of V301 and V302.

The tube V302 operates as an amplifier, the output of which is taken from the cathode end of the cathode resistor R308. Amplifier V302 is operative only when a ground connection is supplied to the cathode of the tube through terminal 9 of conector V301 and resistor R308. The tone output at terminal 5 of connector V301 is therefore keyed by the presence of a ground return at terminal 9 of the connector P301.

A tone selector circuit is shown in FIG. 5 and is essentially an amplifier circuit responsive to a particular audio frequency, including a rectifier to provide a direct current signal to operate a relay such as K1 or K9.

The tone selector shown in FIG. 5 includes a connector P401 which may be mated with connector A2 or connector A3 in FIG. 3B. Plate voltage for the tubes of the tone selector is supplied through terminal 4 of connector P401. A ground connection is supplied through terminal 1 and a filament voltage supplied through terminal 3. The tone input to the tone selector is connected through terminal 2 of P401 and the output is connected through terminal 8.

The input to the tone selector is connected from terminal 2 of connector P401 through a variable resistor R401 and a coupling capacitor C401 to the grid of an amplifier tube V401*a*. A resistor R403 is connected between the grid of V401*a* and ground for bias, and a resistor R402 is connected between the grid of V406 and the plate circuit of V401*a* and V402*a* for feedback. A plate resistor R404 is provided in the plate circuit of V401*a*. A plate-driven amplifier V401*b* is connected in the cathode circuit of V401*a*. The grid of the amplifier V401*b* is connected to terminal 4 of connector J401. Connector J401 is adapted to have connected thereto a conventional audio tone network such as "Du Mont" Audio Tone Networks Models Nos. 88001951 through 88001959 and 88001961, all manufactured by Allen B. Du Mont Laboratories, Inc., of Clifton, New Jersey.

Cathode resistor R405 is provided in the cathode circuit of amplifier V401*b*, which is shunted by a bypass capacitor C402. A further amplifier tube V402*a* is provided having its grid coupled to the plate of amplifier V401*a* and also having a resistor R407 connected between its grid and ground so that amplifier V402 is driven by amplifier V410*a*. A resistor R408 is supplied in the cathode circuit of tube V402 and the cathode of V402 is coupled back through a coupling network consisting of a capacitor C403 and a resistor R406 through terminal 5 of the connector J401 to which is connected the conventional audio tone network.

The output of V402*a* is coupled from its cathode through a capacitor C404 and a resistor R409 to the grid of a final cathode V402*b*. The signal to tube V402*b* is rectified by means of a diode CR401 connected between the junction of capacitor C404 with resistor R409 and ground. A resistor R411 is provided in the cathode circuit of amplifier V402*b*. The plate of amplifier V402*b* is connected through terminal 8 of connector P401 and through a relay such as K1 or K9 to a potential source of approximately 150 volts.

V402 therefore controls a relay connected to terminal 8 of connector P401 so that the relay is pulsed in response to the reception of audio tone of a particular frequency at terminal 2 of connector P401. A resistor R401 may be provided by passing amplifier V402*b* to provide the proper pulse current for a particular relay.

It will be understood that the particular tone generator and tone selector apparatus illustrated in FIGS. 4 and 5 is presented purely for illustration and that many conventional types of circuits could be substituted for either of these circuits, all within the scope of the invention.

*Test circuits*

The normal operation of the telephone termination equipment has been fully described by reference to FIGS. 3A through 5. However, certain additional apparatus is provided for testing the termination equipment of the system as a whole. A conventional telephone dial M101 and a test tone generator 32*b* are provided for making test calls. Switches S102, S103 and S104 are provided so that simulated test calls may be made as though they originated at a mobile radio telephone station or at a telephone system central exchange subscriber. A telephone jack J103 is connected to a winding T103*b* of transformer T103 so that a handset may be connected to monitor the telephone termination equipment. A conventional anti-loading resistor R11 is connected to the telephone jack J103 and a voltage dropping resistor R103 is connected in series with the telephone jack J103 so that the proper voltage is provided at the handset.

The manner in which a handset plugged into the jack J103 and dial M101 may be utilized to test the equipment is believed to be obvious from the previous detailed explanation of the operation of the equipment and will not be explained in detail.

From the foregoing description it will be seen that an improved automatic radio telephone dial system is provided by the present invention which has among its many advantages the fact that dial calls may be made between mobile radio telephone stations of the system.

A particular system utilizing specified numbers of digits and specified code numbers has been described for the purpose of illustration. However, it should be understood that different code numbers, or greater or lesser numbers of digits may be used to perform the various functions by simple modifications of the apparatus.

In addition to the various modifications and variations which have been suggested, many other modifications and variations could be made to the preferred embodiment of the invention which was shown by way of illustration, without exceeding the scope of the invention. Accordingly, the scope of the invention is not to be construed to be limited to the particular embodiments or variations thereof shown or suggested, but is to be limited solely by the appended claims.

What is claimed is:

1. An automatic radio telephone system for signaling radio subscriber stations comprising a radio receiver tuned to a first predetermined frequency at each of said subscriber stations, a radio transmitter tuned to a second predetermined frequency and a dial signal generator at at least one of said subscribers stations, a base station having a radio transmitter tuned to said first frequency and a receiver tuned to said second frequency, each adapted to communicate with said subscriber stations, means for activating said base station transmitter and causing said base station transmitter to re-transmit dial signals received by said base station receiver, said last means to be actuated upon reception of a first predetermined signal by said base station receiver from a radio subscriber station transmitter, means at a second of said subscriber stations for causing a signal to be given at said second subscriber station in response to a second predetermined signal transmitted by the first said subscriber station, relayed by said base station and received by said second subscriber station.

2. An automatic radio telephone system for providing communication between a plurality of radio subscriber stations comprising a radio receiver tuned to a first predetermined frequency and a radio transmitter tuned to a second predetermined frequency at each of said subscriber stations, a base station having a radio transmitter tuned to said first frequency and a radio receiver tuned to said second frequency, each adapted to communicate with said subscriber stations, means for activating said base station transmitter and causing said base station transmitter to re-transmit dial signals received by said base station receiver, said last means being actuated upon reception of a first predetermined signal by said base station receiver from one of said subscriber station transmitters, and means at a second of said subscriber stations for causing a signal to be given at said second subscriber station in response to a second predetermined signal transmitted by the first said subscriber station, relayed by said base station, and received by said second subscriber station.

3. An automatic radio telephone system for providing communication between a plurality of radio subscriber stations comprising a radio receiver tuned to a first predetermined frequency and a radio transmitter tuned to a second predetermined frequency at each of said subscriber stations, a base station having a radio transmitter tuned to said first frequency and a receiver tuned to said second frequency, each adapted to communicate with said subscriber stations, means for activating said base station transmitter and causing said base station transmitter to re-transmit dial signals received by said base station receiver, said last means being actuated upon reception of a first predetermined signal by said base station receiver from one of said subscriber station transmitters, and means at a second of said subscriber stations for causing a signal to be given at said second subscriber station in response to a second predetermined signal transmitted by the first said subscriber station, relayed by said base station and received by said second subscriber station, said second predetermined signal being different from said first predetermined signal.

4. An automatic radio telephone system for providing communication between radio subscriber stations comprising a radio receiver tuned to a first predetermined frequency and a radio transmitter tuned to a second predetermined frequency at each of said subscriber stations, a base station having a radio transmitter tuned to said first frequency and a radio receiver tuned to said second frequency, each adapted to communicate with said sub-transmitter and coupling a tone generator to said trans-scriber stations, means for activating said base station mitter, means for modulating said tone generator in response to predetermined signals received by said base station receiver, and means at a second of said subscriber stations for causing a signal to be given at said second subscriber station in response to a predetermined tone signal received by the receiver of said second subscriber station from said base station transmitter.

5. An automatic radio telephone system for providing communication between a telephone exchange and a plurality of radio subscriber stations and between said radio subscriber stations comprising a radio transmitter and a radio receiver at each of said subscriber stations, a base station having a single radio transmitter and a single radio receiver and adapted to communicate with said subscriber stations, means for establishing a communication channel from a radio subscriber station to said telephone exchange in response to a predetermined signal from said subscriber station and means for establishing a communication channel from said radio subscriber station through said base station receiver and transmitter to another radio subscriber station of said system in response to a different predetermined signal from said radio subscriber station.

6. In an automatic dial radio-telephone system having a base station transmitter and receiver, apparatus associated with said base station transmitter for terminating calls at the end of a predetermined period comprising a timer controlled switch, means operated concurrently with said base station transmitter for starting said timer controlled switch, means for connecting said switch in said system to terminate a call upon the operation of said switch means for rendering the last means inoperative for calls between mobile radio stations of said system.

7. In a mobile radio telephone system, a radio control station coupled to an automatic telephone exchange and having a single radio transmitter and a single radio receiver, a plurality of mobile stations each having means for transmitting a mobile station radio carrier and means for receiving a control station radio carrier, means at each of said mobile stations for initiating a call to said radio control station, means at said radio control station operated in response to receipt of said call for transmitting a control station radio carrier, means for maintaining said control station transmitting means in operating condition to maintain said control station carrier during transmission of said mobile station carrier, means also responsive to initiation of said call for causing said radio control station to seize a line to said automatic telephone exchange, means at said control station responsive to receipt of called number dial pulses from said mobile station for transferring a version of said pulses to said seized line to call a called subscriber having said called number and means responsive to the dialing of a predetermined number for releasing said line to said automatic telephone exchange and preparing said control station to retransmit a dial signal from a mobile station to a second mobile station adapted to be signalled thereby.

8. Apparatus as claimed in claim 7 further including apparatus for eliminating false dial pulses from said control station comprising means for disabling said means at said control station responsive to receipt of called number dial pulses from said mobile station for transferring a version of said pulses to said seized line, a timer, and means responsive to said timer for operating said disabling means.

9. An automatic radio telephone system for providing communication between radio subscriber stations comprising a radio transmitter and receiver at each of said subscriber stations, a base station having a single transmitter and a single receiver, each adapted to communicate with said subscriber stations, means for activating said base station transmitter and coupling a tone generator to said transmitter in response to a predetermined dial pulse signal from one of said radio subscriber stations, means for modulating said tone generator in response to dial pulse signals received by said base station receiver, means at a second of said subscriber stations for causing a signal to be given at said second subscriber station in response to a predetermined tone signal received by the receiver of said second subscriber station from said base station transmitter, and means for decoupling said tone generator and interconnecting said base station receiver and transmitter after reception of a predetermined number of dial pulse digits at said receiver and the reception of a radio carrier signal at said base station receiver.

References Cited in the file of this patent

UNITED STATES PATENTS

| | | |
|---|---|---|
| 2,523,914 | Molnar | Sept. 26, 1950 |
| 2,616,032 | Herrick | Oct. 28, 1952 |
| 2,722,598 | McDonald | Nov. 1, 1955 |
| 2,731,514 | Oberman | Jan. 17, 1956 |

FOREIGN PATENTS

| | | |
|---|---|---|
| 80,088 | Denmark | Nov. 7, 1955 |
| 570,415 | Great Britain | July 5, 1945 |

UNITED STATES PATENT OFFICE
CERTIFICATE OF CORRECTION

Patent No. 3,009,149 November 14, 1961

Ramsey McDonald

It is hereby certified that error appears in the above numbered patent requiring correction and that the said Letters Patent should read as corrected below.

Column 9, line 34, for "G101b" read -- K101b --; column 10, line 1, for "12" read -- K12 --; column 12, line 33, for "note" read -- noise --; column 13, line 42, for "time" read -- timer --; column 18, line 44, for "delay" read -- relay --; column 23, lines 2 to 5, for "with said sub-transmitter and coupling a tone generator to said transcriber stations, means for activating said base station mitter," read -- with said subscriber stations, means for activating said base station transmitter and coupling a tone generator to said transmitter, --.

Signed and sealed this 17th day of April 1962.

(SEAL)
Attest:

ESTON G. JOHNSON
Attesting Officer

DAVID L. LADD
Commissioner of Patents